United States Patent
Fouda et al.

(10) Patent No.: US 10,996,199 B2
(45) Date of Patent: May 4, 2021

(54) ARTIFACT IDENTIFICATION AND REMOVAL METHOD FOR ELECTROMAGNETIC PIPE INSPECTION

(71) Applicant: Halliburton Energy Services, Inc., Houston, TX (US)

(72) Inventors: Ahmed Elsayed Fouda, Spring, TX (US); Burkay Donderici, Pittsford, NY (US); Ilker R. Capoglu, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/345,816

(22) PCT Filed: Aug. 23, 2018

(86) PCT No.: PCT/US2018/047772
§ 371 (c)(1),
(2) Date: Apr. 29, 2019

(87) PCT Pub. No.: WO2019/046101
PCT Pub. Date: Mar. 7, 2019

(65) Prior Publication Data
US 2020/0182830 A1    Jun. 11, 2020

Related U.S. Application Data (60) Provisional application No. 62/552,173, filed on Aug. 30, 2017.

(51) Int. Cl.
| | | |
|---|---|---|
| *G01N 17/02* | (2006.01) | |
| *G01N 27/90* | (2021.01) | |
| *E21B 47/092* | (2012.01) | |
| *E21B 47/12* | (2012.01) | |

(52) U.S. Cl.
CPC ....... *G01N 27/9046* (2013.01); *E21B 47/092* (2020.05); *G01N 17/02* (2013.01); *E21B 47/12* (2013.01)

(58) Field of Classification Search
CPC .... G01N 17/02; G01N 27/9046; G01N 27/90; G01N 27/85; E21B 47/092; E21B 47/007; (Continued)

(56) References Cited

U.S. PATENT DOCUMENTS

| | | |
|---|---|---|
| 9,715,034 B2 | 7/2017 | Omeragic et al. |
| 2006/0218619 A1* | 9/2006 | Dommisse ............... G06T 7/00 725/148 |

(Continued)

FOREIGN PATENT DOCUMENTS

| | | |
|---|---|---|
| EP | 3182173 | 6/2017 |
| WO | 2017151117 | 9/2017 |

(Continued)

OTHER PUBLICATIONS

ISRWO International Search Report and Written Opinion for PCT/US2018/047772 dated Dec. 5, 2018.

*Primary Examiner* — Lee E Rodak
*Assistant Examiner* — Brent J Andrews
(74) *Attorney, Agent, or Firm* — John Wustenberg; C. Tumey Law Group PLLC (57) ABSTRACT

A method for detecting corrosion may comprise placing an electromagnetic logging tool into a wellbore, emitting an electromagnetic field from a transmitter, energizing a casing with the electromagnetic field to produce an eddy current, recording the eddy current from the casing with a receiver, creating a well log from the recorded eddy current, removing a collar signal from the well log to obtain a collar-removed signal, calculating a baseline signal from the collar-removed signal, subtracting the baseline signal from the collar-re- (Continued)

moved signal to obtain a baseline-subtracted signal, calculating an artifact-removed signal with the baseline-subtracted signal, and displaying the artifact-removed signal. A system for detecting corrosion may comprise an electromagnetic logging tool, wherein the electromagnetic logging tool comprises a transmitter and a receiver. The system may further comprise an information handling system.

20 Claims, 8 Drawing Sheets

(58) Field of Classification Search
CPC .......... E21B 47/00; G06T 7/00; H04N 19/86; H04N 19/85; H04N 19/61; G01V 3/38; G01V 3/28; G01V 3/26; G01V 3/30
See application file for complete search history.

(56) References Cited

U.S. PATENT DOCUMENTS

| | | |
|---|---|---|
| 2011/0290011 A1 | 12/2011 | Dowla et al. |
| 2012/0095686 A1* | 4/2012 | Legendre .............. E21B 49/003 702/6 |
| 2014/0091943 A1* | 4/2014 | Herrera Duarte ....... E21B 47/13 340/854.9 |
| 2017/0138905 A1* | 5/2017 | Khalaj Amineh .... E21B 47/007 |
| 2017/0176629 A1* | 6/2017 | Omeragic ................ G01V 3/28 |

FOREIGN PATENT DOCUMENTS

| | | |
|---|---|---|
| WO | 2018084863 | 5/2018 |
| WO | 2018084865 | 5/2018 |
| WO | 2019032262 | 2/2019 |

* cited by examiner

FIG. 11

ARTIFACT IDENTIFICATION AND REMOVAL METHOD FOR ELECTROMAGNETIC PIPE INSPECTION

BACKGROUND

For oil and gas exploration and production, a network of wells, installations and other conduits may be established by connecting sections of metal pipe together. For example, a well installation may be completed, in part, by lowering multiple sections of metal pipe (e.g., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for identifying artifacts with an electromagnetic logging tool in an eccentric pipe configuration comprising a plurality of pipes. Electromagnetic (EM) sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. The EM logging tools may operate on a conveyance. EM logging tools may include an independent power supply and may store the acquired data on memory. A magnetic core may be used in defect detection in multiple concentric pipes.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The received signal is typically proportional to the amount of metal that is around the transmitter and the receiver. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple nested pipe stings, the received signal may be a non-linear combination of signals from all pipes. As a result, it is not possible, in general, to use a simple linear relationship to relate the signal received to metal loss or gain for pipe strings composed of three or more nested pipes. In order to address this problem, a method called "inversion" is used. Inversion makes use of a forward model and compares it to the signal to determine the thickness of each pipe. The forward model is executed repeatedly until a satisfactory match between the modeled signal and measured signal is obtained. The forward model typically needs to be run hundreds of times or more for each logging point. As a result, it needs to be a computationally efficient model. In order to achieve the computational efficiency, certain simplifications of the real problem need to be considered for the forward model. One of the most significant simplifications is the centralization assumption, where each pipe is assumed to be perfectly centered with respect to other pipes as well as the measurement instrument. Making such an assumption significantly improves the forward modeling computational efficiency and allows a feasible EM multi-pipe inspection solution. However, it also results in artifacts at depths where such assumption is invalidated, e.g. where eccentricity effects exist. The ideas that are disclosed below facilitate identification and removal of such artifacts.

Figure 1:
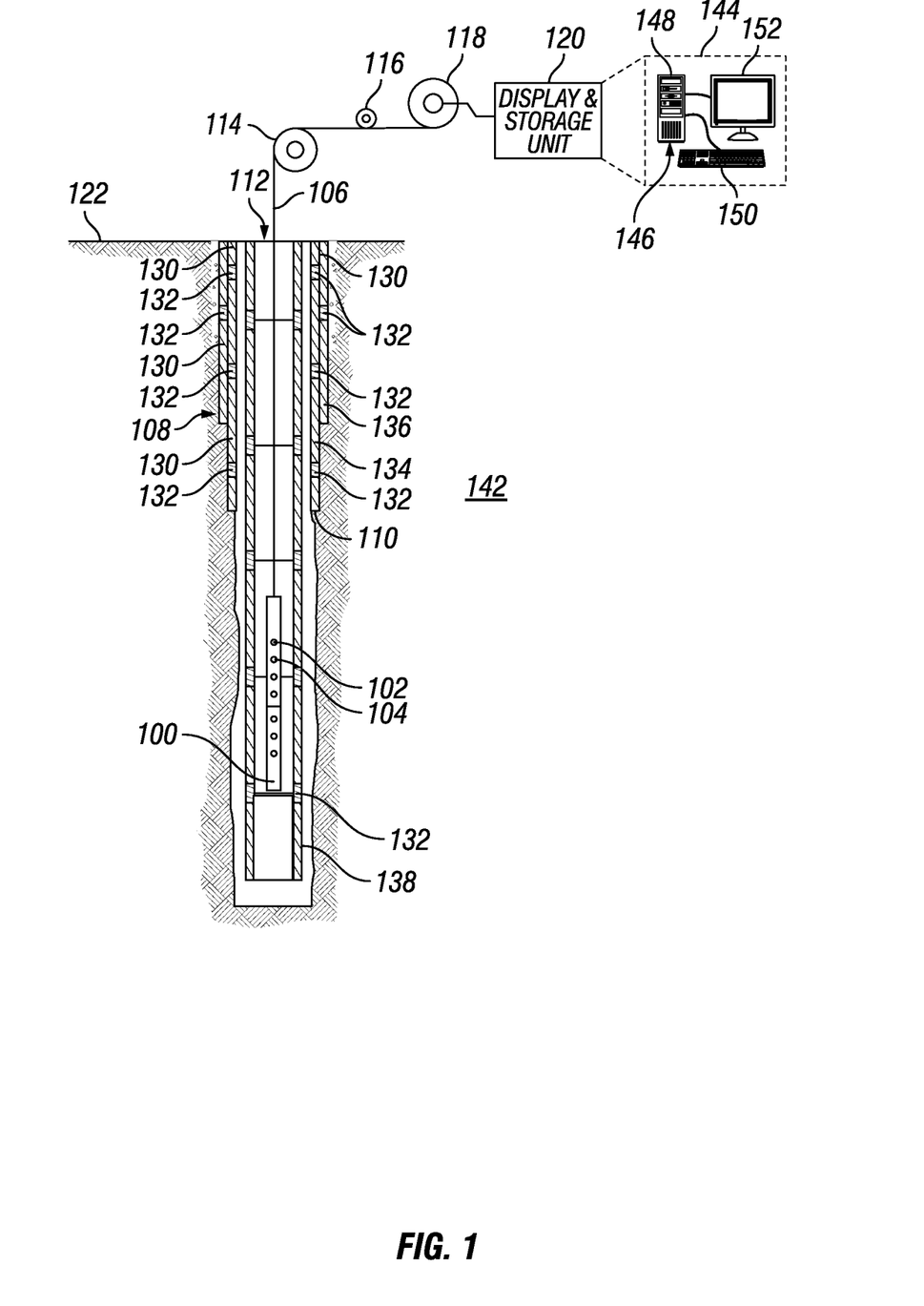
FIG. 1 illustrates an example of an EM logging tool disposed in a wellbore.

FIG. 1 illustrates an operating environment for an EM logging tool 100 as disclosed herein. EM logging tool 100 may comprise a transmitter 102 and/or a receiver 104. In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may transmit electromagnetic fields into subterranean formation 142. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed along with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may transmit, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Transmission of EM fields by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed along with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be measured by receivers 104 placed at some distance on the EM logging tool 100 from transmitter 102, as shown on FIG. 1. Alternatively, the secondary electromagnetic fields may be measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. The remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\,t \qquad (1)$$

and the magnitude of the impedance shows the dependence:

$$\exp[-2(\sqrt{\omega\mu\sigma/2})t] \qquad (2)$$

where ω is the angular frequency of the excitation source, μ is the magnetic permeability of the pipe, σ is the electrical conductivity of the pipe, and t is the thickness of the pipe. By using the common definition of skin depth for the metals as:

$$\delta = \sqrt{\frac{2}{\omega\mu\sigma}} \qquad (3)$$

The phase of the impedance varies as:

$$\varphi \simeq 2\frac{t}{\delta} \qquad (4)$$

and the magnitude of the impedance shows the dependence:

$$\exp[-2t/\delta] \qquad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal and receiver 104 may record the reflected excitation signal for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
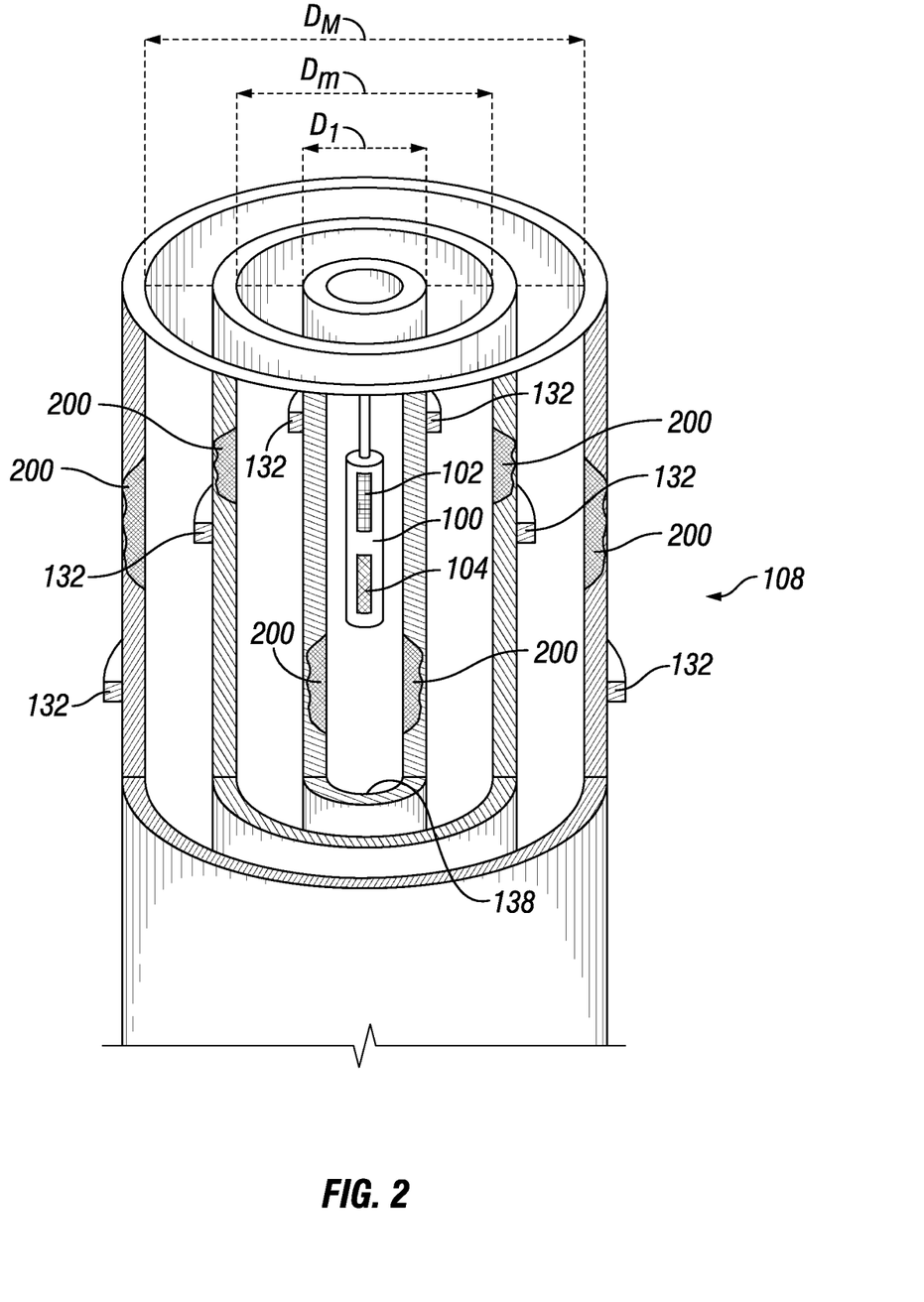
FIG. 2 illustrates an example of arbitrary defects within multiple pipes.

FIG. 2 shows EM logging tool 100 disposed in pipe string 138 which may be surrounded by a plurality of nested pipes (e.g. first casing 134 and second casing 136) and an illustration of anomalies 200 disposed within the plurality of nested pipes. As EM logging tool 100 moves across pipe string 138 and casing string 108, one or more transmitters 102 may be excited, and a signal (mutual impedance between 102 transmitter and receiver 104) at one or more receivers 104, may be recorded.

Due to Eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing and frequencies may be utilized. For example, short spaced transmitters 102 and receivers 104 may be sensitive to first casing 134, while longer spaced transmitters 102 and receivers 104 may be sensitive to second casing 136 and/or deeper ($3^{rd}$, $4^{th}$ etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. However, there may be factors that complicate interpretation of losses. For example, deep pipe signals may be significantly lower (e.g., one or two orders of magnitude lower) than shallower pipe signals. Double dip indications appear for long spaced transmitters 102 and receivers 104. Spatial spread of long spaced transmitter-receiver signals for a collar 132 may be about one foot (0.3048 meter) to about 6 feet (1.8288 meters). Due to these complications, methods may need to be used to accurately inspect pipe features.

Figure 3A:
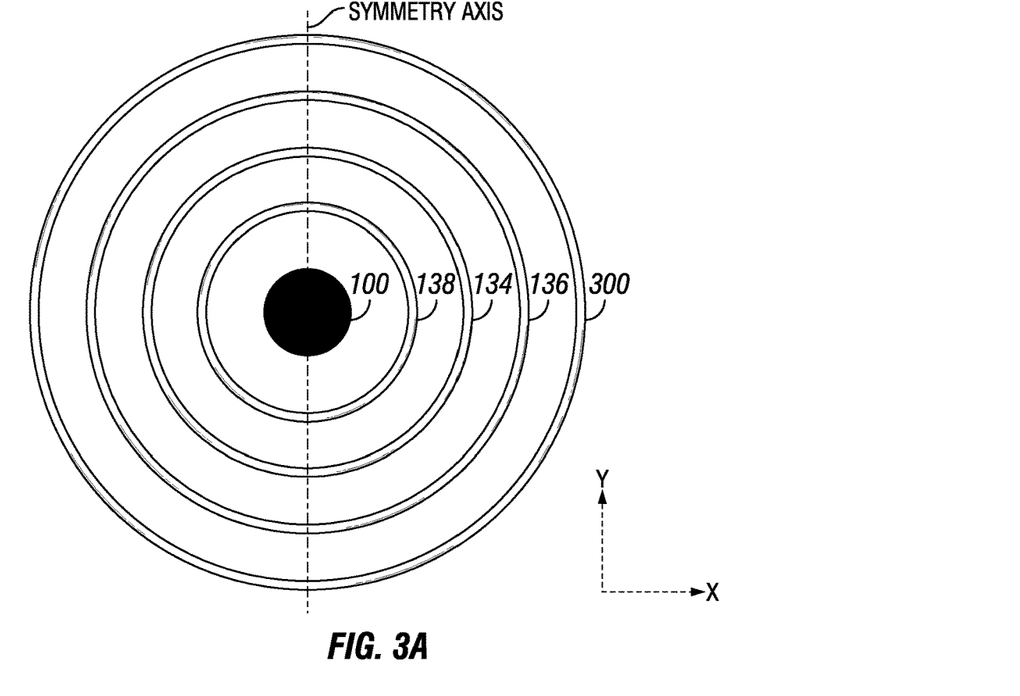
FIG. 3A illustrates an example of a concentric pipe configuration.
Figure 3B:
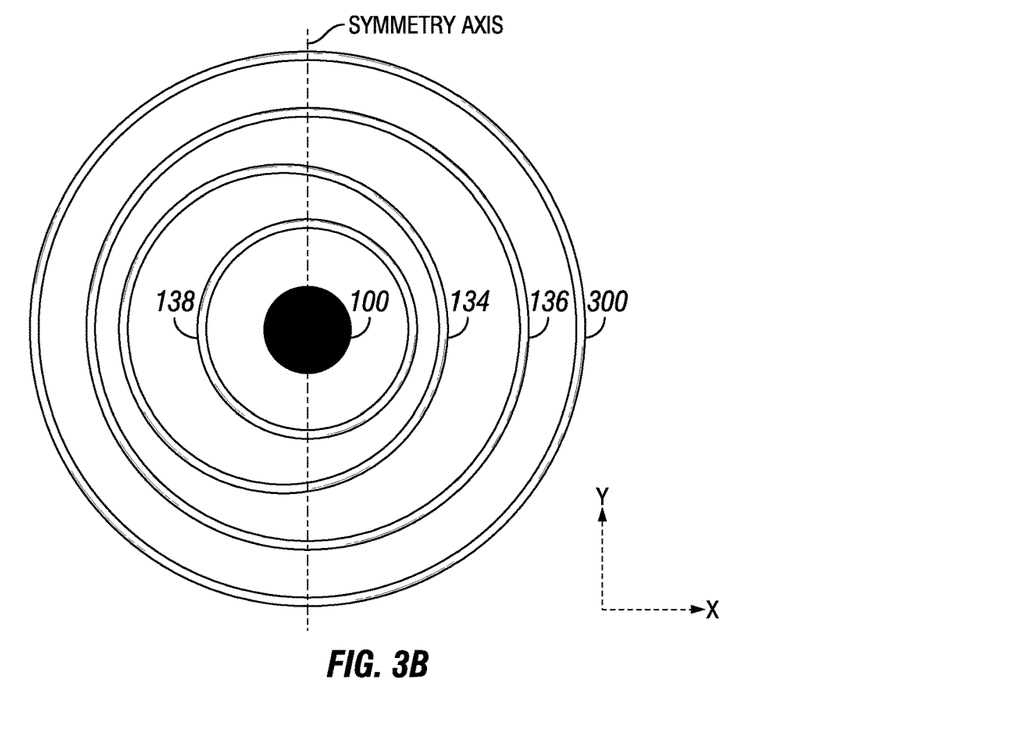
FIG. 3B illustrates an example of an eccentric pipe configuration.

Multi-pipe inspection may utilize inversion to accurately inspect pipe features. Inversion is an iterative process where the signals generated from a forward model are matched to measurements. This is accomplished by making adjustments to the input parameters iteratively until a forward model of the input parameters matches the measured responses. This process typically involves execution of the forward model hundreds of times for each logging point. Various methods may be utilized to accelerate this process. These methods may utilize forward models that make use of a concentricity assumption, where nested pipes are assumed to have the same center point. FIG. 3A shows an example concentric pipe configuration, and 3B shows an example eccentric pipe configuration. As illustrated in FIGS. 3A and 3B, EM logging tool 100 may be disposed within pipe string 138, first casing 134, second casing 136, and third casing 300.

When a forward model based on concentric pipe configuration, illustrated in FIG. 3A, is used in a model-based inversion of a problem with eccentric pipe configuration, illustrated in FIG. 3B, certain artifacts appear in the inversion results. More specifically, unaccounted eccentricity effect may manifest itself as metal loss or corrosion in one or multiple pipes.

Figure 4:
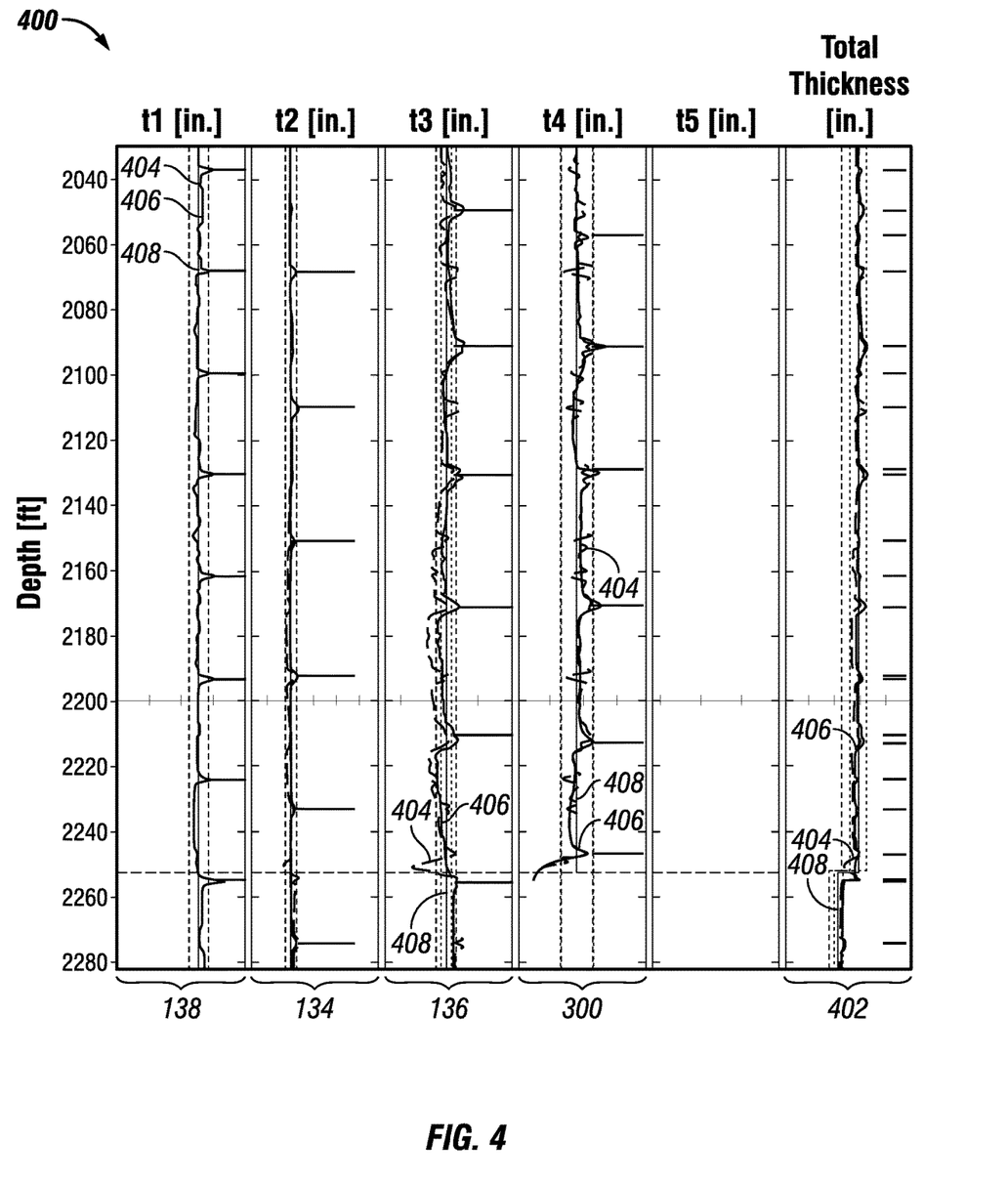
FIG. 4 illustrates an example of a well log.

FIG. 4 shows an example well log 400 with such artifact. The y-axis shows the depth and x-axis shows multiple thickness tracks. The thickness of pipe string 138, first casing 134, second casing 136, and third casing 300 are illustrated with individual thicknesses and the last track illustrates a total thickness 402 as recorded. Thicknesses decrease towards the left and increase towards the right. In each track, curve 404 is the nominal pipe thickness and curve 406 is the thickness output from inversion in case no artifact removal is applied. Curve 404 follows a smoothly increasing and decreasing baseline which is the signature characteristics of artifact. Curve 408 shows the thickness after artifact removal at the output. The corrected thickness shows much less variation on the baseline. As discussed below, identifying and removing the artifacts from the input and/or output of an inversion method may allow an operator to determine the location of corrosion across multiple pipes in casing string 108 (e.g., referring to FIG. 1).

Figure 5:
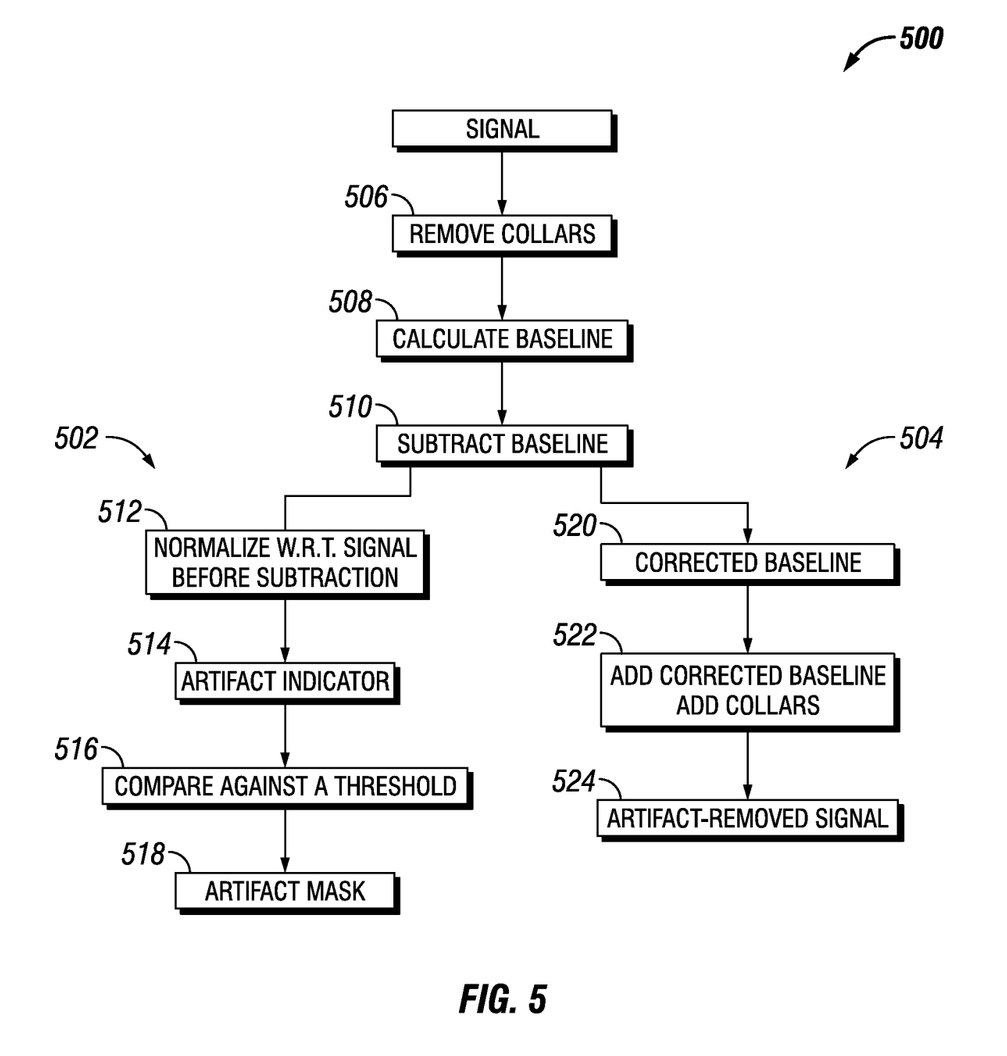
FIG. 5 illustrates an artifact identification and removal flow chart.

FIG. 5 shows an artifact identification and removal flow chart 500. Flow chart 500 may be broken into two sections. First section 502 may comprise artifact identification and second section 504 may comprise artifact removal. As illustrated in flow chart 500, both first section 502 and second section 504 may include similar beginning steps. It should be noted that first section 502 for artifact identification and second section 504 for artifact removal may operate independently of each other. However, it is possible to enhance the robustness of second section 504, artifact removal, by applying removal only at locations where an artifact may be identified and disposed, as determined in first section 502.

Both first section 502 and second section 504 may be being with an input signal, recorded by receiver 104 (e.g. referring to FIG. 1), being used in step 506. Step 506 may operate and function to remove collars, through the removal of collar signals, from the input signal. For example, collars 132 (e.g., referring to FIG. 1) may be identified utilizing any available algorithms and replacing the collar signals with a smoother background signal. Without limitation, algorithms may be peak detection algorithms, matched filters, machine learning, and/or the like. Since collars 132 generate signals with large magnitude, collars 132 may make it difficult to numerically identify a baseline of the input signal. In examples, a large magnitude may be 20 percent higher than the baseline (nominal) signal. Step 506 may ensure that the identification and removal operations below may be performed based on an accurate baseline possible.

Figure 6A:
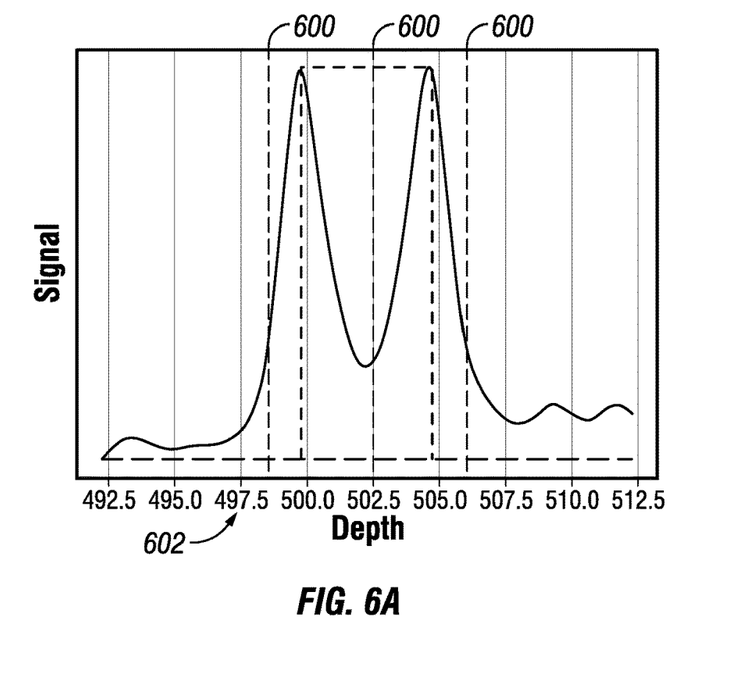
FIG. 6A illustrates an example of a chart of an initial breakpoint placement.
Figure 6B:
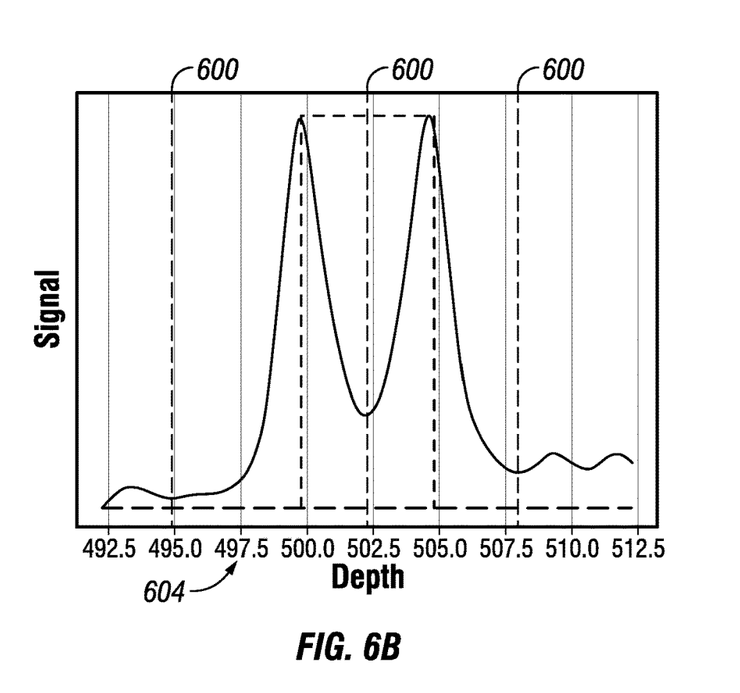
FIG. 6B illustrates an example of a chart of a final breakpoint placement.

After identification of the position of collars 132 in step 506, removal of the collar signal may be accomplished using one of the many methods available. In one specific embodiment, certain break-points may be identified for each collar 132 (e.g., referring to FIG. 1) in the depth dimension based on the location of collar 132 and expected width of the signature, as shown in FIGS. 6A and 6B. Break-points 600 may be placed at $d_c-0.6w$, $d_c$ and $d_c+0.6w$ positions where $d_c$ is the depth of collar 132 and w is the expected width of collar signature. FIG. 6A shows an example initial placement 602. The initial break-points 600 may be moved outward to the first local minima/maxima to reduce the abrupt changes in the slope of the signal due to collar removal. Final positions 604 of the break-points after the move are shown in FIG. 6B.

After break-points 600 are finalized, collars 132 (e.g., referring to FIG. 1) may be removed by interpolating in between break points 600. A linear and/or any other interpolation function may be used. The process outlined above may be repeated for all collars 132 that were identified in step 506, referring back to FIG. 5. In the case of overlapping collars 132, the removal may be applied additively where collar 132 removed signal, $V_{cr}$, may be used as the input signal for the second (overlapping) removal of collar 132. In examples, removal of the collar signal may be accomplished by applying a low pass filter to the signal. As an example, a rectangular filter with a width of 5 feet (1.524 meters) may be used as a mean filter or a median filter.

Figure 7:
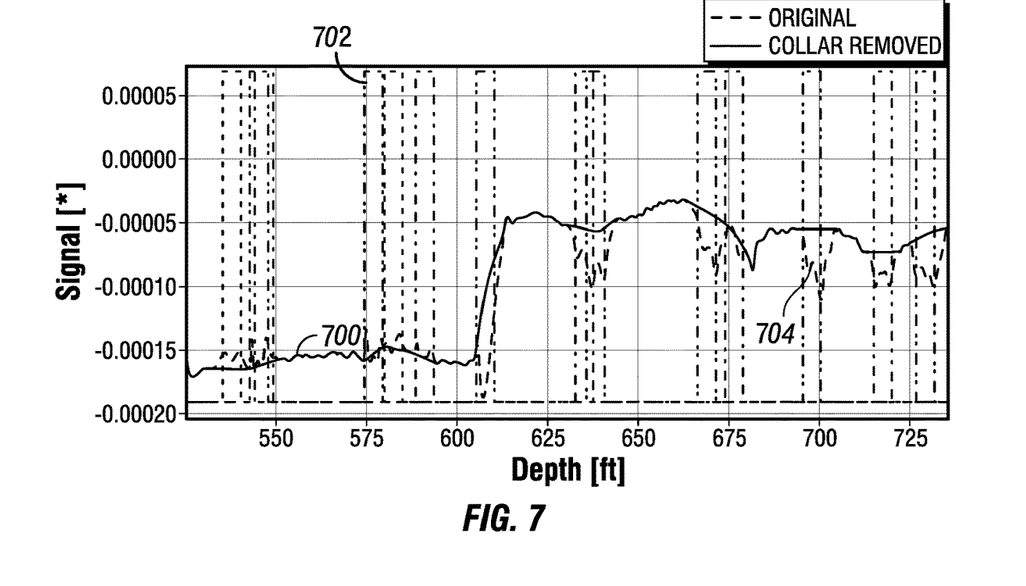
FIG. 7 illustrates an example of a chart of a signal after collar removal with initial breakpoint placement.

FIG. 7 shows an example of a collar-removed signal 700 after collar removal. Initial break points 702 are shown as well as an overlay. Collars 132 (e.g., referring to FIG. 1) associated with different pipes may be captured by original signal 704, as illustrated in FIG. 7.

As illustrated in FIG. 7, collar removal generates a collar-removed signal 700 that is free of "collar spikes" and may allow an operator to easily and accurately identify the underlying baseline. The difference between the original signal 704 and the collar-removed signal 700 may be stored as the "collar signal," $V_c$, to be used later in the process below.

Referring back to FIG. 5, after step 506, removing collars from the signal input, step 508 calculate a baseline, $V_b$. This may be accomplished by low-pass filtering the collar removed signal, $V_{cr}$, from step 506, using the equation:

$$V_b = LP\_Filter(V_{cr}) \quad (6)$$

The pass-band of the low-pass may be selected to reject any local variations (such as metal loss) and only capture slow baseline variations. As an example, a rectangular filter with a width of 60 feet (18.288 meters) may be used as a mean filter or a median filter. It should be noted that any width may be utilized in a rectangular filter. After step 508, the calculated baseline may be input into step 510. Step 510 may operate and function to subtract the baseline from step 508 to obtain the baseline-subtracted signal using the equation below:

$$V_{bs} = V_{cr} - V_b \quad (7)$$

A final signal from step 510 may include artifacts and metal losses. It may be used in both first section 502 for artifact identification and/or second section 504 for artifact removal. For example in first section 502, artifact identification, may begin with step 512 which may normalize with respect to the signal before substation. The may be performed by normalizing the baseline subtracted signal from step 510, $V_{bs}$, with the collar removed signal, $V_{cr}$. This may give an output, in step 514, of an artifact indicator. As an example, the artifact indicator in step 514 may be calculated as the real part of the baseline subtracted signal from step 510 divided by the absolute value of the collar removed signal at ant depth selected by an operator, and for each signal, as shown below:

$$A_{ind} = \frac{|V_{bs}|}{|V_{cr}|} \text{sign}\left(\text{Re}\left(\frac{V_{bs}}{V_{cr}}\right)\right) \quad (8)$$

Alternative formulas for calculation of an artifact indicator in step 514 may be used. As an example, real or imaginary part of $V_{bs}$ may be used in the place of the absolute value. Similarly, real or imaginary part of $V_{cr}$ may be used in the place of the absolute value. In general, any normalized signal from step 512 or non-normalized baseline subtracted signal from step 510, $V_{bs}$, may be used as an artifact indicator in step 514. However, normalization in step 512 may allow for the artifact indicator in step 514 to be compared against a threshold, as seen in step 516. In step 516 an operator may set thresholds for automatic or convenient manual anomaly detection that may be more or less constant with respect to wells. In examples, a threshold on the artifact indicator may be defined as a cutoff between what is considered an artifact (e.g., eccentricity) and what is considered a real feature (e.g., a defect or weight change). An operator may manually adjust the threshold to apply more or less aggressive artifact removal.

In examples, an artifact indicator from step 514 may be calculated as a difference between the normalized amplitudes of the baseline subtracted signal at two different receivers, where a first receiver may operate and function to produce shallow-readings and a second receiver may operate and function to produce deep-readings, or vice-versa. The baseline subtracted signal may be normalized by collar removed signal. For example, the artifact indicator from step 514 may be calculated as:

$$A_{ind} = \frac{|V_{bs}|_{shallow}}{|V_{cr}|_{shallow}} - \frac{|V_{bs}|_{deep}}{|V_{cr}|_{deep}} \quad (9)$$

The artifact indicator in Equation (9) may be indicative of casing eccentricity. Equation (9) may be based on the observation that eccentricity results in larger signal variations in shallow readings compared to deep readings. A positive indicator value indicates eccentricity. For example, the first receiver that may operate and function to produce shallow-readings may be sensitive to only 0.5" (0.01 meter) of total metal thickness, and the second receiver that may operate and function to produce deep-readings may be sensitive to up to 2" (0.05 meter) of total metal thickness. Step 516 may produce an output in step 518 that is an artifact mask. The artifact mask is a curve versus depth that indicates whether an artifact was detected at a given depth or not. The artifact mask is used to selectively apply artifact removal on raw data.

Figure 8:
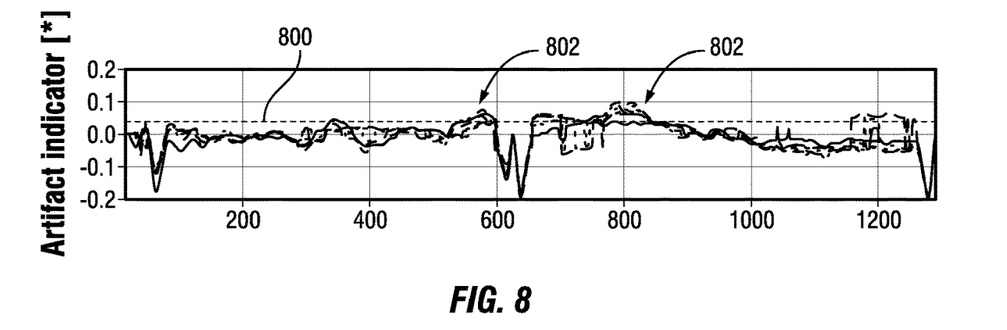
FIG. 8 illustrates an example of a chart of an artifact indicator as a function of depth.

FIG. 8 shows example artifact indicators as a function of depth (x-axis). Each curve is an artifact indicator for a different receiver of EM logging tool 100 (e.g. referring to FIG. 1). A threshold 800 of 0.04 is drawn as a dotted line. As illustrated in FIG. 8, an artifact indicator 802 is a value larger than 0.04 around 575 and 800 feet (175.26 and 243.84 meters), indicating a potential artifact which may be due to eccentricity.

Figure 9:
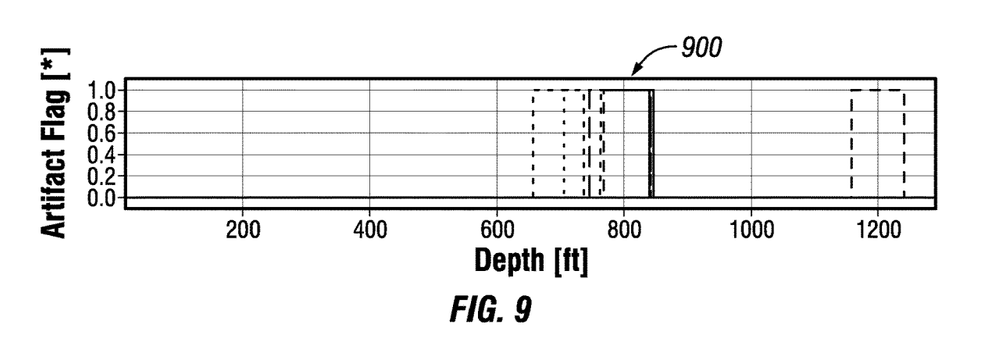
FIG. 9 illustrates an example of a chart of an artifact flag corresponding to the artifact indicator.

FIG. 9 shows artifact flags 900 that correspond to the same case in FIG. 8. Artifact flags 900 are calculated by comparing artifact indicator 802 (e.g. referring to FIG. 8) to a threshold 800 (e.g. referring to FIG. 8) and setting artifact flag 900 when artifact indicator 802 is above threshold 800. In FIG. 9, a value of 0 indicates an unset artifact flag 900, and a value of 1 indicates a set artifact flag 900 following the binary convention.

In order to eliminate spuriously set artifact flags 900 (e.g. referring to FIG. 9), a width-filter may be applied. The width-filter may check the width of any contagious depth range where artifact flag 900 is set, and modify artifact flag 900 to unset if the width is below a certain threshold. This forces only "wide" zones to show in artifact flag 900. As an example, a width threshold of 60 feet (18.288 meters) may be used. As noted above, width-filter may utilize any suitable width that an operator may choose.

Referring back to FIG. 5, second section 504, artifact removal, may remove artifacts from a baseline signal (e.g., referring to FIG. 7, baseline 700). In order to achieve artifact removal in second section 504, second section 504 may begin with step 520 to find a corrected baseline, $V_{cb}$. In step 520, the corrected baseline may be a constant value which is the average of all signals in a given well plan zone. Well plan zones may be defined as the range of depths where the number of nested pipes may be the same. Well plan zones may also be defined as the range of depths where inner pipe diameter or thickness may be substantially the same. The corrected baseline may also be calculated as the peak of a histogram of signal values (mostly repeated value of the signal) in each zone. In step 522 the corrected baseline in step 520 and including the collar signal, $V_c$, is added to baseline subtracted signal from step 510, $V_{bs}$ yielding the artifact removed signal in output 524:

$$V_{ar} = V_{bs} + V_{cb} + V_c \quad (10)$$

Figure 10:
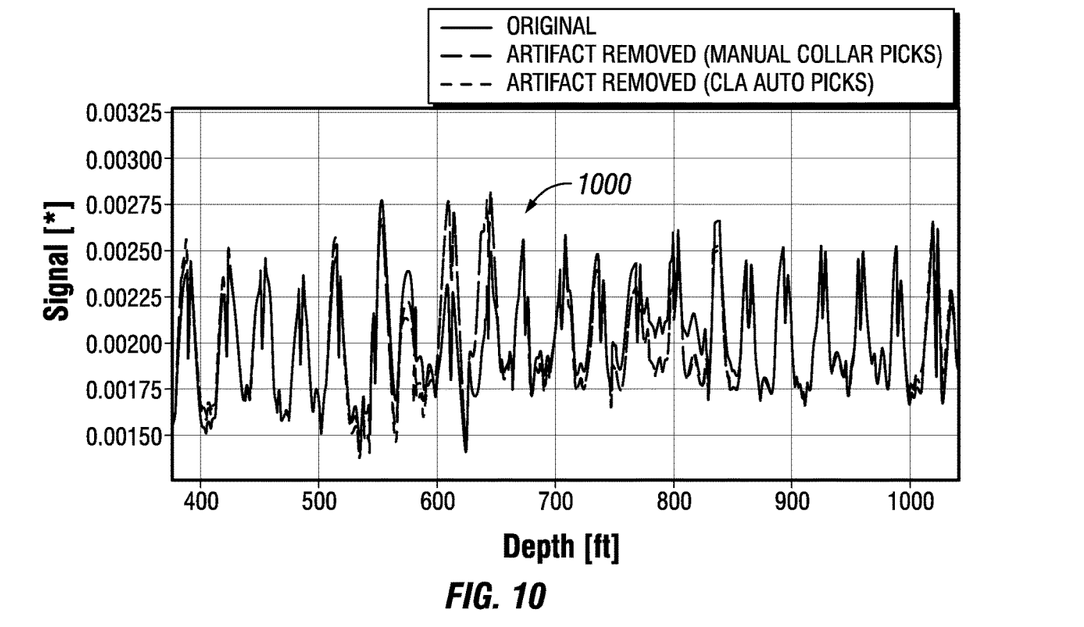
FIG. 10 illustrates an example of a chart after artifact removal.

FIG. 10 shows an example of artifact removal result. As it may be seen from FIG. 10, slowly varying shifts (e.g., shown on FIG. 10 as artifacts 1000) in the signal are successfully removed. The artifact removed signal may be used as an input to the inversion to produce more accurate (artifact removed) inversion results (e.g., estimated pipe thickness).

As disclosed above, the artifact removal may be done over the entire well log 400, or at places where artifact indicator, in step 514, may identify an artifact 1000.

Figure 11:
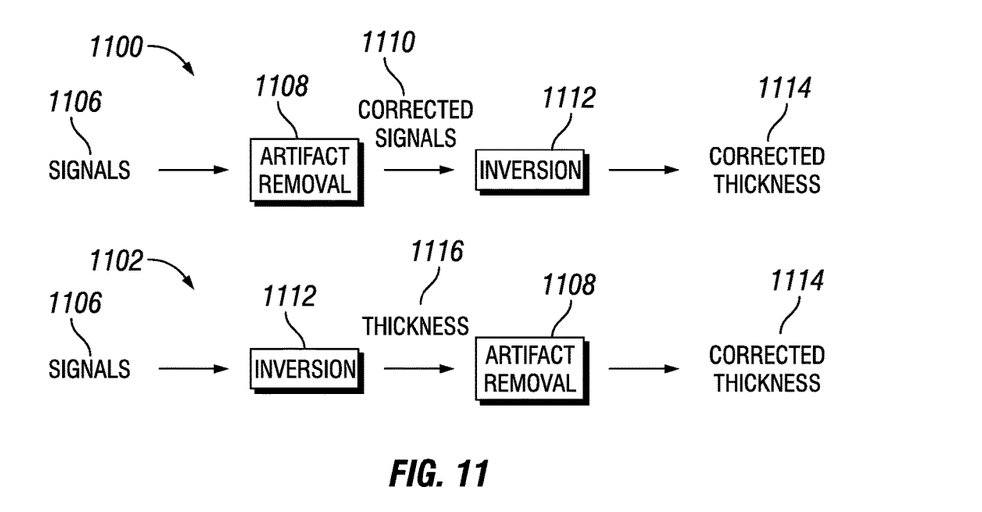
FIG. 11 illustrates an example of an application of inversion utilizing outputs rather than inputs.

FIG. 11 illustrates a first method 1100 and a second method 1102 that may embodiment the methods described above. In first method 1100, a recorded signals 1106 from receiver 104 (e.g., referring to FIG. 1) may be placed into artifact removal 1108. It should be noted that artifact removal 1108 is artifact identification and removal flow chart 500 (e.g., referring to FIG. 5). Output 1110 from artifact removal 1108 may be a corrected signal or a plurality of corrected signals. Output 1110 may be placed into an inversion scheme 1112, discussed above, which may produce an output 1114 for corrected thickness.

In second method 1102, the process in first method 1100 may be reversed. For example, as illustrated in FIG. 11, recorded signals 1106 from receiver 104 (e.g., referring to FIG. 1) may be placed into inversion scheme 1112. Output 1116 from inversion scheme 1112 may be thickness. Output 1116 may be placed into artifact removal 1108. It should be noted that artifact removal 1108 is artifact identification and removal flow chart 500 (e.g., referring to FIG. 5), which may produce an output 1114 for corrected thickness.

Determining and locating accurately metal loss downhole may depend on accurately identifying and verifying artifacts. It has been found that slowly varying artifacts such as eccentricity may significantly complicate interpretation and may result in false indications of corrosion. As a result, indication and removal of such artifacts may be crucial to increase reliability of electromagnetic corrosion inspection products and minimize unnecessary remedial operations for customers.

Prior technology may solve these problems utilizing an inversion misfit. This assumes that an accurate model of the EM logging tool 100 and casing string 108 is present and any deviation from a forward model may be resolved by the inversion. In practice, this may not be true because utilizing a model-based inversion may heavily depend on the validity of the underlying model as well as the specific definition of the cost function. Improvements over other techniques and tools may, for example, be found to be independent of the numeric associated with inversion and as a result they provide a more practical and robust solution to the problem.

By identifying and location defects, such as set in corrosion, thinning pipe thickness, and/or the like the operator may be able to determine the exact location within a pipe string, or casing, where a well operation may be performed in response to the identified feature, such as corrosion. In examples, any suitable well operation may be performed to address the corrosion in response to the identified feature, including, but not limited to, chemical treatments, among others. Well operations may involve replacing, fixing, or adding casing string, tubing, collars, filters, packers, and/or the like. In examples, an operator may spot treat corrosion by removing the corrosion and adding protective coatings to the affected area. This may prevent the loss of production fluids, chemicals, and/or the like into the formation.

Accordingly, a system and method for correcting for a dielectric effect and obtaining an accurate resistivity estimate from a downhole device may be provided. The systems and methods disclosed herein may include any of the various features of the systems and methods disclosed herein, including one or more of the following statements.

Statement 1: A method for detecting corrosion may comprise placing an electromagnetic logging tool into a wellbore. The electromagnetic logging tool may comprise a transmitter, wherein the transmitter is configured to emit an electromagnetic field, and a receiver, wherein the receiver is configured to record an eddy current. The method may further comprise emitting the electromagnetic field from the transmitter; energizing a casing with the electromagnetic field to produce an eddy current; recording the eddy current from the casing with the receiver; creating a well log from the recorded eddy current; removing a collar signal from the well log to obtain a collar-removed signal; calculating a baseline signal from the collar-removed signal; subtracting the baseline signal from the collar-removed signal to obtain a baseline-subtracted signal; calculating an artifact-removed signal with the baseline-subtracted signal; and displaying the artifact-removed signal.

Statement 2: The method of statement 1, wherein the removing the collar signal comprises identifying collar locations, identifying a width for a collar signature, using interpolation to remove the collar signature around each of the collar locations.

Statement 3: The method of any preceding statement, wherein the collar locations are identified automatically using an automatic collar locator algorithm.

Statement 4: The method of any preceding statement, wherein the removing the collar signal comprises passing the eddy current through a low pass or a median filter.

Statement 5: The method of any preceding statement, wherein the calculating a baseline signal comprises filtering the collar-removed signal with a low pass or a median filter.

Statement 6: The method of any preceding statement, wherein the eddy current is a raw or a normalized measurement.

Statement 7: The method of any preceding statement, wherein the eddy current is indicative of corrosion levels.

Statement 8: The method of any preceding statement, further comprising calculating an artifact indicator.

Statement 9: The method of statement 8, wherein a depth at which an artifact removal is applied is determined based on artifact indicator values.

Statement 10: The method of statements 8 or 9, wherein the calculating the artifact indicator comprises normalizing the baseline-subtracted signal with the collar-removed signal or the eddy current.

Statement 11: The method of statements 8 to 10, wherein the calculating the artifact indicator comprises dividing the absolute value of the baseline-subtracted signal to the absolute value of the collar-removed signal.

Statement 12: The method of statement 11, wherein a sign of the artifact indicator is determined based on a phase difference of the baseline-subtracted signal and the collar-removed signal.

Statement 13: The method of statements 8 to 10, where in the calculating the artifact indicator comprises taking a difference between normalized amplitudes of the baseline-subtracted signal at a first receiver and a second receiver, where the first receiver produces shallow-readings and the second receiver produces deep-readings.

Statement 14: The method of statements 8 to 10 or 13, further comprising calculating an artifact mask, wherein the calculating the artifact mask comprises comparing the artifact indicator with a threshold, and setting a value of an artifact flag to a different value when the artifact indicator exceeds the threshold.

Statement 15: The method of statement 1, wherein the calculating the artifact-removed signal comprises adding a corrected baseline and a plurality of collars to the baseline-subtracted signal, wherein the corrected baseline is a constant per zone; and wherein the constant per zone is defined as a contiguous range of depths comprising a same number of nested pipes, the contiguous range of depths within a first inner pipe diameter and thickness; the constant per zone is the wellbore, an average of the collar-removed signal, or selected from a histogram of the collar-removed signal.

Statement 16: A system for detecting corrosion may comprise an electromagnetic logging tool. The electromagnetic logging tool may comprise a transmitter, wherein the transmitter is configured to emit an electromagnetic field, a receiver, wherein the receiver is configured to record an eddy current, and an information handling system. The information handling system may be configured to create a well log based at least in part on recorded eddy current; remove a collar signal from the well log to obtain a collar-removed signal; calculate a baseline signal from the collar-removed signal; subtract the baseline signal from the collar-removed signal to obtain a baseline-subtracted signal; calculate an artifact-removed signal with the baseline-subtracted signal; and display the artifact-removed signal.

The system of claim 16, wherein the information handling system is further configured to calculate an artifact indicator.

The system of claim 17, wherein a depth at which an artifact removal is applied is determined based on artifact indicator values.

The system of claim 17, wherein the calculate the artifact indicator comprises normalizing the baseline-subtracted signal with the collar-removed signal or the eddy current.

The system of claim 17, wherein the calculate the artifact indicator comprises dividing the absolute value of the baseline-subtracted signal to the absolute value of the collar-removed signal.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for detecting corrosion comprising:
    placing an electromagnetic logging tool into a wellbore, wherein the electromagnetic logging tool comprises:
        a transmitter, wherein the transmitter is configured to emit an electromagnetic field; and
        a receiver, wherein the receiver is configured to record an eddy current;
    emitting the electromagnetic field from the transmitter;
    energizing a casing with the electromagnetic field to produce an eddy current;
    recording the eddy current from the casing with the receiver;
    creating a well log from the recorded eddy current;
    identifying every collar signal in the well log, wherein the collar signal is formed from the eddy current in a collar, wherein the collar connects joints in a pipe string together in the casing;

removing every collar signal from the well log to obtain a collar-removed signal;
calculating a baseline signal from the collar-removed signal;
subtracting the baseline signal from the collar-removed signal to obtain a baseline-subtracted signal;
calculating an artifact-removed signal with the baseline-subtracted signal; and
displaying the artifact-removed signal.

2. The method of claim 1, wherein the removing the collar signal comprises identifying collar locations, identifying a width for a collar signature, using interpolation to remove the collar signature around each of the collar locations.

3. The method of claim 2, wherein the collar locations are identified automatically using an automatic collar locator algorithm.

4. The method of claim 1, wherein the removing the collar signal comprises passing the eddy current through a low pass or a median filter.

5. The method of claim 1, wherein the calculating a baseline signal comprises filtering the collar-removed signal with a low pass or a median filter.

6. The method of claim 1, wherein the eddy current is a raw or a normalized measurement.

7. The method of claim 1, wherein the eddy current is indicative of corrosion levels.

8. The method of claim 1, further comprising calculating an artifact indicator.

9. The method of claim 8, wherein a depth at which an artifact removal is applied is determined based on artifact indicator values.

10. The method of claim 8, wherein the calculating the artifact indicator comprises normalizing the baseline-subtracted signal with the collar-removed signal or the eddy current.

11. The method of claim 8, wherein the calculating the artifact indicator comprises dividing the absolute value of the baseline-subtracted signal to the absolute value of the collar-removed signal.

12. The method of claim 11, wherein a sign of the artifact indicator is determined based on a phase difference of the baseline-subtracted signal and the collar-removed signal.

13. The method of claim 8, where in the calculating the artifact indicator comprises taking a difference between normalized amplitudes of the baseline-subtracted signal at a first receiver and a second receiver, where the first receiver produces shallow-readings and the second receiver produces deep-readings.

14. The method of claim 8, further comprising calculating an artifact mask, wherein the calculating the artifact mask comprises comparing the artifact indicator with a threshold, and setting a value of an artifact flag to a different value when the artifact indicator exceeds the threshold.

15. The method of claim 1, wherein the calculating the artifact-removed signal comprises adding a corrected baseline and a plurality of collars to the baseline-subtracted signal, wherein the corrected baseline is a constant per zone; and wherein the constant per zone is defined as a contiguous range of depths comprising a same number of nested pipes, the contiguous range of depths within a first inner pipe diameter and thickness; the constant per zone is the wellbore, an average of the collar-removed signal, or selected from a histogram of the collar-removed signal.

16. A system for detecting corrosion comprising:
an electromagnetic logging tool, wherein the electromagnetic logging tool comprises:
a transmitter, wherein the transmitter is configured to emit an electromagnetic field;
a receiver, wherein the receiver is configured to record an eddy current; and
an information handling system configured to:
create a well log based at least in part on recorded eddy current;
identify every collar signal in the well log, wherein the collar signal is formed from the eddy current in a collar, wherein the collar connects joints in a pipe string together in the casing;
remove every collar signal from the well log to obtain a collar-removed signal;
calculate a baseline signal from the collar-removed signal;
subtract the baseline signal from the collar-removed signal to obtain a baseline-subtracted signal;
calculate an artifact-removed signal with the baseline-subtracted signal; and
display the artifact-removed signal.

17. The system of claim 16, wherein the information handling system is further configured to calculate an artifact indicator.

18. The system of claim 17, wherein a depth at which an artifact removal is applied is determined based on artifact indicator values.

19. The system of claim 17, wherein the calculate the artifact indicator comprises normalizing the baseline-subtracted signal with the collar-removed signal or the eddy current.

20. The system of claim 17, wherein the calculate the artifact indicator comprises dividing the absolute value of the baseline-subtracted signal to the absolute value of the collar-removed signal.

* * * * *